United States Patent [19]

Kito et al.

[11] 3,805,525

[45] Apr. 23, 1974

[54] APPARATUS FOR CONTROLLING HYDRAULIC PRESSURE IN A DUAL HYDRAULIC BRAKE SYSTEM

[75] Inventors: Masahiro Kito; Hiromu Kuromitsu, both of Kariya, Japan

[73] Assignee: Aisin Seiki Kabushiki Kaisha, Kariya City, Aichi-Pref., Japan

[22] Filed: May 21, 1971

[21] Appl. No.: 145,667

[30] Foreign Application Priority Data
May 21, 1970 Japan............................ 45-43428
May 21, 1970 Japan............................ 45-43429

[52] U.S. Cl.................. 60/403, 60/416, 60/566, 303/10
[51] Int. Cl........................... F15b 7/08, B60t 13/14
[58] Field of Search.......... 60/51, 54.5, 54.6 P, 403, 60/416, 566; 303/10, 54, 52; 136/627.5

[56] References Cited
UNITED STATES PATENTS

| | | | |
|---|---|---|---|
| 3,526,089 | 9/1970 | Fulmer | 60/52 B |
| 3,659,421 | 5/1972 | Wilson | 60/54.5 P |
| 3,532,395 | 10/1970 | Julow | 303/54 |
| 3,684,330 | 8/1972 | Kito | 303/10 |
| 3,661,429 | 5/1972 | Kito | 303/54 |
| 3,107,127 | 10/1963 | Chevreux et al. | 303/54 |

Primary Examiner—Edgar W. Geoghegan
Assistant Examiner—A. M. Zupcic
Attorney, Agent, or Firm—Sughrue, Rothwell, Mion, Zinn & Macpeak

[57] ABSTRACT

In the dual hydraulic brake system the passages leading to the wheel brakes are closed during off service conditions and fluid communication is established between both hydraulic brake systems and a common reservoir. Valves are provided for interrupting fluid communication between the two systems upon application of the brakes and for applying fluid under pressure to the brakes. Upon a failure in one or both systems the manual braking pressures will still be supplied to the brakes for stopping the vehicle.

15 Claims, 3 Drawing Figures

APPARATUS FOR CONTROLLING HYDRAULIC PRESSURE IN A DUAL HYDRAULIC BRAKE SYSTEM

This invention relates to a method for the control of a dual hydraulic wheel brake system and the mechanism for carrying out same.

An object of the present invention is to provide a method and an apparatus for the control of hydraulic brake pressure in a dual system serving for that purpose, operable of providing an absolute safety in braking operation even when one or both of the related dual systems should fail to maintain the pressurized condition by an accidential cause such as pipe burst or the like.

A further object is to provide a method as well as an apparatus of the above kind which relies upon the operation of an effective duo-manual by operatable means which is capable of operation in case of any pressure failure accident of the above kind.

These and further objects, features and advantages of the invention will become more apparent when read the following detailed description of the invention by reference to the accompanying drawings illustrative substantially of two preferred embodiments of the invention only by way of example and in no limiting sense of the invention. In the drawings.

Figure 1:
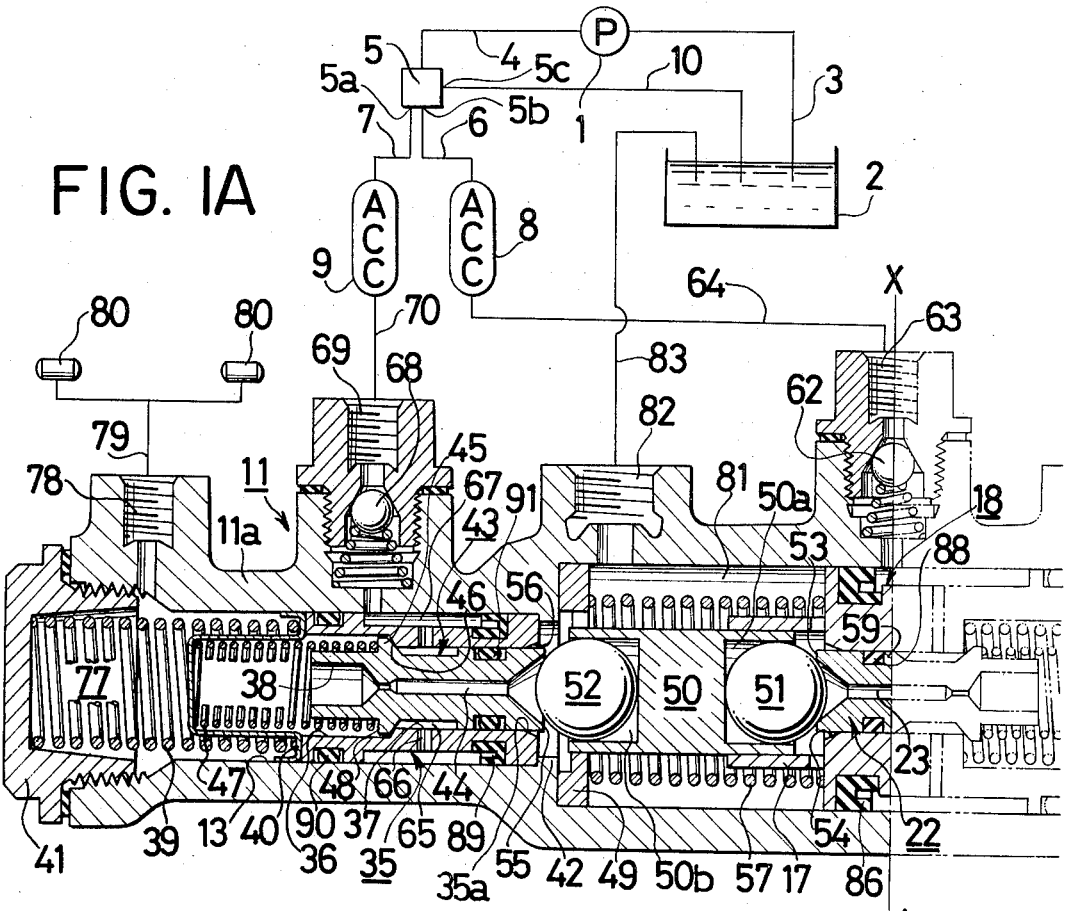
FIGS. 1A and 1B represent in combination a single drawing illustrative of a first preferred embodiment of the invention in its schematic and sectional mode, these two partial figures being to be conjointed together by overlapping respective section lines X–X' one after another.

Referring now to FIGS. 1A and 1B, numeral 1 represents a conventional hydraulic pump which is arranged to such hydraulic liquid such as oil from a reservoir 2 through a suction piping 3 and delivers it through a delivery piping 4 to a charging valve assembly 5 which is shown only schematically on account of its very popularity. Outlets 5a and 5b from said valve assembly 5 lead through respective pipings 6 and 7 to accumulators 8 and 9. Valve assembly 5 is so designed and arranged that it allows to accumulate pressure liquid in the accumulators 8 and 9 to a certain predetermined pressure level.

But, an excessive pressure, when accumulated in these accumulators 8 and 9, will be discharged therefrom through the valve assembly 5 via a further outlet 5c and bypass piping 10 to the reservoir 2.

The charge valve assembly 5 acts, as will be more fully described hereinafter, as an isolating valve so called among those skilled in the art, adapted for delivery of pressure liquid only to the regularly working one of the both mutually independent hydraulic brake piping systems to be described, should the other of the systems fail to maintain the hydraulically pressurized conditions on account of occasionally happened pipe bursting or the like cause.

Numeral 11 represents a brake force control unit comprising a larger diameter cylinder portion 12 and a smaller diameter cylinder portion 13 rigidly united with each other, a ring recess 14 being formed at the outer end of the said portion 13 and receiving detachably a snap ring 20. The larger cylinder portion 12 receives axially slidably a first or larger piston 18 comprising its larger and smaller bored parts 15 and 16 and a guiding part 17. The right hand end 19 of first piston 18, when seen in FIG. 1, is normally kept in pressure contact with snap ring 20 under the influence of a return spring 57. Piston 18 is formed axially with a stepped bore 21 comprising a main hydraulic chamber 71 and a reduced bore part 21a, the latter receiving a first means formed preferably into a slide 22. This valve slide 22 is formed axially with a central bore 23 which is enlarged at its outer end so as to form a cone-shaped valve seat 24 adapted for cooperation with a valve ball 51. A valving portion 24 is provided on the valve slide 22 at an intermediate point nearer to the outer end thereof and in the form of a cone-shaped projection which is designed and arranged to cooperate with an inside valve seat 25 formed on the first piston 18 under the influence of spring 26. This spring 26 abuts by its one end upon the uprightly rising surface 27 defined by the valving portion 24 and by its another end formed on a shoulder 29 on a second piston 28 which is slidably mounted within the larger part 71 of bore 21.

In proximity to the outer end, the first piston 18 is provided detachably with a snap spring 31 acting as a stop against which the outer end 30 of second piston 28 normally abuts as shown, under the influence of a spring 32 which abuts by its one end against a shoulder 33 formed on first piston 18 and by its another end against a further shoulder 34 formed on second piston 28.

A third piston 35 comprises a larger diameter part 36 and a smaller diameter part 37 made integral therewith and is slidably mounted in smaller bored cylinder part 13, said piston being bored axially and centrally at 38.

A spring 39 is inserted under compression between a plug 41 and the outer end of said third piston 35 through retainer 40, said plug being screwed in the outer femaled end of the housing 11a of said unit 11. By the urging force provided by the spring 39, third piston 35 is kept by its inner end in pressure contact with a stop shoulder 42 formed on the inside wall surface of said smaller cylinder part 13. Second valve means 43 in the form of a valve slide is mounted slidably within the stepped bore 35a of third piston 35, said second valve slide 43 being formed centrally an elongated axial bore. A valving cone projection 45 is formed on the peripheral surface of valve slide 43 and kept normally in pressure contact with a valve seat 46 formed on the inside wall surface of third piston 35 under the influence of an urging spring 47. One end of this spring 47 abuts by its inner end against the upright wall part 48 of said cone projection 45, while the opposite or outer end of said spring abuts against the bottom wall of said retainer 40 which is designed substantially and preferably in the form of a cup as shown.

A holder slide 50 is slidably mounted at its both ends by a stop ring 49 for spring 57 and by said guiding part 17 of first piston 18, said slide 50 having concentric recesses 50a and 50b formed at its both ends and representing thus substantially an I-section when seen in its longitudinal section shown in FIG. 1. Valve balls 51 and 52 are mounted movably in respective recesses 50a and 50b and project partially therefrom.

Ball 51 is normally kept in pressure contact with a valve seat 53 formed at the innermost and enlarged end of axial bore 23 of first valve slide 53, while valve 52 is kept normally in separation from valve seat 55 formed similarly at the innermost and enlarged end of axial bore 44 of second valve slide 43.

As will be more fully described hereinafter, valve ball 51 is adapted for cooperation with a further seat 54 formed on first piston 18, in the case of manual control operation. In the similar way, valve ball 52 is adapted for cooperation with a further seat 56 formed on third piston 35 in the similar case as above.

First piston 18 is urged to move rightwards in FIG. 1 under the influence of said spring 57 which is inserted under precompression between the inner end of the piston and said stop ring 49.

A peripheral recess or chamber 58 is formed at an intermediate part between the both ends of and on first valve slide 22, the outer end of said chamber being defined by the seat 25 when it is sealingly closed and the inner end being defined by a land 59. It should be noted that the cross-sectional areas of the sealed circle on seat 25 and of the land 59 are selected to be equal to each other. Thus, when pressure liquid prevails in the chamber 58, second valve slide 22 is hydraulically balanced in its axial direction and subjected only to spring force at 26, so as to be urged resiliently to move leftwards in FIG. 1 until it abuts against first valve ball 51. The chamber 58 is kept in fluid communication with a peripheral chamber 61 which is formed on the outer peripheral surface of first piston 18 and between the latter and the inside wall surface of larger cylinder part 12, through a lateral passage 60 formed through the wall of first piston 18.

Chamber 61 is kept in fluid communication through a port 63, a check valve means 62 fitted therein, and a piping 64 to accumulator 8.

A peripheral recess or chamber 65 is formed on the outer periphery of second valve slide 43 at an intermediate part between the both ends thereof, as in the similar way to the foregoing chamber 58, and kept in fluid communication through a lateral passage 66 drilled through the wall of third piston 35 with a further peripheral chamber 67 formed on said third piston 35 and between the latter and the inside wall surface of smaller cylinder part 13. Chamber 67 is kept in fluid communication through a port 69, check valve means 68 fitted therein, and a piping 70 with accumulator 9.

Chamber 71 is kept in fluid communication through a lateral passage 72 formed through the wall of first piston 18 with a peripheral recess or chamber 73 formed on first piston 18 and between the latter and the inside wall surface of larger cylinder part 12, said latter chamber 73 being kept in turn in fluid communication with a port 74 and a piping 75 to wheel brake cylinders 76, shown only schematically on account of their very popularity, fitted to, for instance, respective front wheels of an automotive vehicle, not shown.

A chamber 77 is formed at the left-hand end of the cylinder or housing 11a upon screwed coupling of the plug 41 thereto as shown, said chamber being kept in fluid communication through a port 78 and a piping 79 with wheel brake cylinders 80, only schematically shown, for other vehicle wheels, not shown, for instance rear wheels.

Central reservoir chamber 81 formed within the interior space of larger diameter cylinder part 12 and containing the holder slide 50, is kept in fluid communication through a port 82 and a piping 83 to said reservoir 2.

Numeral 84, 85 and 86 represent a plurality of sealing means provided at several places between the first piston 18 and the larger cylinder part 12 for providing necessary seal thereat.

A further sealing means 87 is provided between the larger part 15 of first piston 18 and the outer periphery of second piston for providing effective seal thereat. A still further sealing means 88 is provided between the outer periphery of first valve slide 22 and the inside wall surface of smaller part 16 of first piston 18 for providing effective seal thereat.

Further sealing means 89 and 90 are provided between the outer periphery of third piston 35 and the smaller cylinder part 13 for providing effective seal thereat. A still further sealing means 91 is provided between the outer periphery of second valve slide 43 and the smaller part 37 of third piston 35 for providing effective seal thereat.

Numeral 92 represents a push rod one end of which is linked with a conventional brake pedal 93, while the opposite or inner end of the rod 92 is received in a cone-shaped axial recess 28a formed in the second piston 28 for cooperation therewith. The open outer end of larger cylinder portion 12 is by a resilient dust-prevention cover 94 as shown. Spring 32 is designed to have a larger spring force than that at 57. In the similar way, spring 39 is so designed that it exerts a stronger force than that shown at 47. These springs 32, 39, 47 and 57 are positioned as shown.

In the preferred embodiment shown, the design is made so that the inside bore of larger part 15 of first piston 18 is of the same diameter as the bore of smaller cylinder portion 13. In the similar way, the bore of smaller part 16 of first piston 18 has the same diameter as that of smaller part 37 of third piston 35.

The operation of the first embodiment of the invention so far shown and described is as follows:

When the driven of the automotive vehicle depresses brake pedal 93, motion will be transmitted therefrom through push rod 92 to second piston 28 which is thus caused to move leftwards. Motion is further transmitted from the second piston through springs 26 and 32 to first piston 18 which is thus caused to slide leftwards in FIG. 1. At the same time, first valve slide 22 is moved leftwards in unison until the valve seat 53 has been brought into pressure contact with first valve ball 51 and substantially concurrently, second valve ball 52 has been brought into pressure contact with the seat 55 on second valve slide 43, thereby interrupting fluid communication between the reservoir chamber 81 and wheel cylinders 76 and 80.

With further depression of pedal 93, the leftward movement of second piston 28 and first piston 18 caused by the further advancing movement of push rod 92 will compress both springs 26 and 47 further when these springs had been initially set to a certain predetermined common pressure and the respective engagements between valving projections 24 and 25 and valve seats 45 and 46 are released simultaneously and fluid communication between the chambers 58 and 71, on the one hand, and that between the chambers 65 and 77, on the other hand, will be established.

When the spring force at 47 is initially set to be smaller than that at 26, the leftward movement of second piston 28 and first piston 18 will compress firstly the spring 47, thereby valving projection 45 being separated from valve seat 46 and the chambers 65 and 77 being brought into fluid communication with each other. Then, the fluid reaction conveyed thus to the chamber 77 will cause substantially concurrently a disengagement of valving projection 24 from its mating seat 25, thereby bring both chambers 58 and 71 into fluid communication.

When the spring force at 47 had been initially set to be larger than that of spring 26, the leftward movement of the pistons 28 and 18 will compress firstly the spring 26 further, and the reverse process will be invited. More specifically in this case, fluid communication between the chambers 65 and 77, on the one hand, and that between the chambers 58 and 71 will be established in succession. Therefore, liquid pressure conveyed from accumulator 8 to the chamber 58 will be conveyed to the chamber 71 and thence through lateral passage 72, chamber 73, port 74 and piping 75 to wheel cylinders 76. On the other hand, the liquid pressure conveyed from accumulator 9 to chamber 65 will be conveyed to chamber 77, and thence through port 78 and piping 79 to wheel cylinders 80 so as to perform the wheel braking operation. The reaction felt at this stage at brake pedal 93 is equal to the hydraulic brake pressure supplied to the wheel cylinders, multiplied by the defined cross-sectional area at the valve seat.

When foot pressure is released from brake pedal 93, the spring force at 57 will act effectively upon first piston 18 which is thus moved towards the pedal and valving projections 24 and 45 are brought into engagement with respective mating seats 25 and 46. On the other hand, balls 51 and 52 and respective seats 53 and 55 are brought into disengagement from each other, and thus pressure liquid will be conveyed from wheel cylinders 76 through central bore 23 to reservoir chamber 8, and in the similar way, pressure liquid will be conveyed from wheel cylinders 80 through central bore 44 again to the reservoir chamber, and thence through port 82 and piping 83 back to the reservoir tank 2. In this way, the wheel braking has been terminated.

Since in the present preferred first embodiment, the bore of larger part 15 of first piston 18 had been designed to be equal to that at the smaller cylinder portion 13 and the bore of the smaller part 16 of first piston 18 had been designed to be equal to that measured in the smaller part 37 of third piston 35, wheel cylinder pairs 76 and 80 are subjected to equal braking effort when they are brought into braking position.

Should either one or both of the accumulators 8 and 9 or their related piping systems fail to maintain pressurized conditions by virtue of certain causes such as a pipe burst or the like, a manual operation must be relied upon when braking is desired.

In case pressure fails in both accumulators, when pedal 93 is depressed, motion will be transmitted again therefrom through push rod 92, second piston 28 and springs 26 and 32 to first piston 18 and first valve slide 22 which are thus caused to move leftwards when seen in FIG. 1. Therefore, the seat 53 on first valve slide 22 is brought into pressure contact with first valve ball 51 and the seat 55 on second valve slide 43 is brought into pressure contact with second valve ball 52, almost concurrently.

With brake pedal 93 further depressed, the seat 54 on first piston 18 is brought into pressure engagement with first valve ball 51 and the seat 56 on third piston 35 is brought again into pressure engagement with second valve ball almost concurrently, thereby the chambers 71 and 77 being perfectly interrupted from fluid communication with reservoir chamber 81. Since, at this stage, the combined spring force at 26 and 32 is larger than that at 57, the spring 32 is not further compressed although the spring 57 has been further compressed.

With the brake pedal 93 further depressed, second piston 28 is urged to move leftwards in FIG. 1 and both springs 26 and 32 are further compressed and the liquid pressure in the chamber 71 is increased. This increased liquid pressure act through balls 51 and 52 upon third piston 35 which is thus caused to move leftwards, resulting in the liquid pressure in the chamber 77 being increased, for performing respective braking operations. At this stage, pressure liquid in both chambers 71 and 77 are positively prevented from returning to accumulators 8 and 9 and by virtue of the operation of check valve means 62 and 68. The reaction force to be felt at the brake pedal 93 is equal to the wheel cylinder pressure multiplied by the diameter of the bore in which the second piston 28 slides.

Should the liquid pressure fail to maintain in the accumulator 9 or its related piping by a certain or other cause such as pipe burst, the same manual brake operation will be invited as before. Or more specifically, a depression of brake pedal 93 will cause first valve ball 51 and its mating seat 53 and second valve ball 52 and its mating seat 55 are brought into respective pressure engagement and thus, the fluid communication of chambers 71 and 77 with reservoir chamber 81 being interrupted. With the brake pedal still further interrupted, the engagement between valving projection 24 and seat 25 is released and the wheel cylinder pair at 76 will receive a hydraulic pressure from the effective accumulator 8 in response to the depressed degree of the brake pedal and the second valve ball 52 is brought into pressure engagement with its seat 56 under the influence of the thus developed hydraulic brake pressure multiplied by the cross-sectional area of first valve slide 22. The leftward movement of third piston 35 will cause the hydraulic pressure in chamber 77 to be elevated so as to hydraulically energize the other wheel cylinder pair at 80.

At occasional failure of liquid pressure in accumulator 8 or its related piping, the valve balls 51 and 52 will be brought in the same manner as above into respective pressure engagement with mating valve seats 53 and 55, thereby the fluid communication of the chambers 71 and 77 with reservoir chamber 81 being interrupted. With further depression of brake pedal 93 under these operative conditions, the engagement between valving projection 45 and valve seat 46 is released and the wheel cylinder pair at 80 will receive a hydraulic brake pressure from the effective accumulator 9 and in response to the now depressed degree of brake pedal 93. The first valve ball 51 and its seat 54 are brought into pressure engagement under the influence of the developed hydraulic brake pressure multiplied by the cross-sectional area of second valve slide 43 and the liquid pressure in the chamber 71 will be increased so as to apply a hydraulic brake pressure to the remaining wheel cylinder pair at 76.

It will be seen from the foregoing that the dual hydraulic brake system so far shown and described is provided with two independent systems for manual operation. Thus, at failure of hydraulic pressure in either or both of the hydraulic systems, the disabled system can operate nevertheless manually for performing the brake application. Therefore, a completely disabled brake conditions could not be brought about and an absolute braking safety may be assured at every pressure failure at every point in the dual hydraulic brake system.

Figure 2:
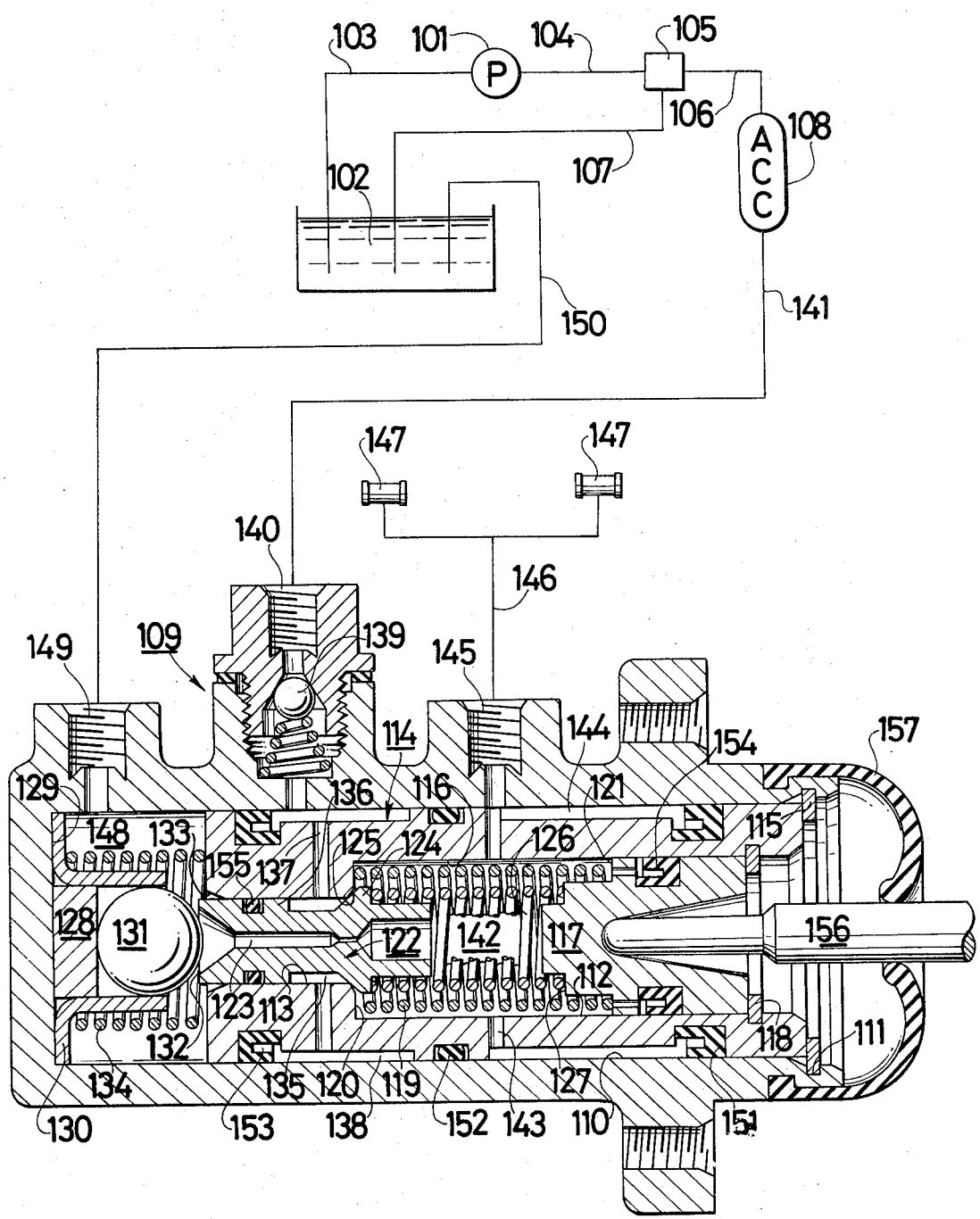
FIG. 2 is a schematic and sectional drawing of a preferred second embodiment of the invention as represented in the similar way to FIG. 1.

Next referring to FIG. 2, a preferred second embodiment of the invention will now be described in detail.

In this figure, 101 denotes a pump; 102 a reservoir; 103 a piping; 104 a piping; 105 a charge valve assembly; 106 a piping; 107 a piping; and 108 an accumulator. These elements 101–108 are connected one after another as shown in FIG. 2.

The charge valve assembly 105 is so designed and arranged that when the pumped liquid exceeds in its pressure beyond a predetermined value, the pump 101 is brought into its non-load condition so that the liquid is circulated through pipings 3, 4 and 7 upon accumulation of pressure liquid within the accumulator 108 to a certain predetermined pressure level.

Numeral 109 represents generally a brake force control unit comprising a cylinder 110 opened at the right-hand end thereof and formed thereat with a ring recess 111 receiving detachably a snap spring 115. The cylinder 110 receives slidably a first piston 114 comprising a larger diameter part 112 and a smaller diameter part 113. Normally, the right-hand end of first piston 114 is kept in pressure contact with said snap ring 115 acting as a stop. Said first piston 114 is formed centrally and axially with a bore 116 which receives slidably a second piston 117 within the larger diameter part 112. In close proximity to the right-hand end of said larger diameter part 112, the latter is provided detachably a snap ring 118 against which said second piston abuts normally under the spring force at 119. This spring abuts by its one end upon a shoulder 120 on said first piston 114 and by its another end on a further shoulder 121 on said second piston 117. Numeral 122 denotes a valve slide slidably mounted in the bore of said small diameter portion 113 and is formed centrally and axially with a bore 123. A valving projection 124 is formed on the outer periphery of said valve slide 122 and normally kept in pressure contact with a seat 125 formed by a shoulder 120 on first piston 114 under the influence of spring pressure at 126. This spring 126 abuts by its one end upon the right-hand side of said valving projection 124 and by its other end upon a shoulder 127 formed on second piston 117.

Numeral 128 represents a space mounted on the left-hand end wall 129 of cylinder 110, a ball holder 130 is kept in position shown by cooperation with cylinder wall 129 and spacer 128. The holder 130 mounts movably a valve ball 131 which is kept normally in separation from the left-hand end of valve slide 122. But, in the operative position, valve ball 131 is brought into pressure engagement with seat 132 formed on valve slide 122. In the case of manual braking operation, as will be more fully described hereinafter, valve ball 131 is brought into pressure engagement with a seat 133 formed on said first piston 114.

Numeral 132 denotes a spring which urges first piston 114 to move rightwards. This spring 134 abuts by its one end upon the left-hand end of first piston 114 and by its another end upon space 128.

A peripheral recess or chamber 135 is formed at an intermediate part between the both ends of and on valve slide 122, said chamber being defined at its one end by the sealed valved circle on seat 125 and at its another end by a land 136, the effective cross-sectional areas of the thus defined both extremities of the chamber being selected to be same with each other.

Thus, with the chamber 135 charged with fluid pressure, the valve slide 122 is not subjected to any differential and axial hydraulic force and subjected to only spring force at 126 so as to be urged to move leftwards. The chamber 135 is kept in fluid communication with a chamber 138 formed on the periphery of first piston 114, the latter chamber 138 being kept in fluid communication through a port 140, check valve means 139 fitted therein and a piping 141 to accumulator 108. A chamber 142 is formed by part of said bore 116 and kept in fluid communication through lateral bore 143 formed through the wall of first piston 114; a chamber 144 formed on the periphery of first piston 114; port 145; and a piping 146 to wheel cylinders 147.

A reservoir chamber 148 is formed within the interior space of cylinder 110 in close proximity of cylinder end wall 129 and kept in fluid communication through a port 149 and piping 150 to the reservoir 102. Numeral 151; 152 and 153 represent respective seals positioned between the periphery of first piston 114 and the inside wall surface of cylinder 110, so as to provide effective seal thereat.

Seal means 154 is inserted between the second piston 117 and the larger part 112 of first piston 114, so as to provide effective seal thereat.

Seal means 155 is inserted between the valve slide 122 and the small part 113 of first piston 114, so as to provide effective seal thereat.

Push rod 156 is linked to a brake pedal, not shown and the inner end of the rod is kept in pressure with second piston 117. Numeral 157 represents a conventional dust prevention cover. The initial spring force at 119 is selected to be larger than that of spring 134.

The operation of the second embodiment of the invention so far shown and described is as follows:

When the vehicle driver depresses the brake pedal, not shown, motion will be transmitted therefrom through push rod 156 to second piston 117 and first piston 114 through springs 119 and 126, thereby the both pistons being moved leftwards and the valve slide 122 urged by spring 126 to move leftwards being moved in the same direction. In this way, the seat 132 on valve slide 122 and valve ball 131 are brought into pressure engagement with each other. In this case, the spring force at 134 is selected to be smaller than that at 119, and the spring 134 will be further compressed.

With further depression of the brake pedal, valving projection 124 is disengaged from its valve seat 125 so that both chambers 135 and 142 are brought into fluid communication with each other. Therefore, the hydraulic pressure conveyed from acculator 108 to chamber 135 will be transmitted to the chamber 142, thence through lateral passage 143, chamber 144, port 145 and piping 146 to wheel cylinder 147 which is therefore subjected to a braking pressure.

With release of actuating fluid pressure from the brake pedal, the spring force at 134 will become effective to move first piston 142 rightwards, and thus, valving projection 124 is brought into pressure engagement with its valve seat 125, while the seat 132 on valve slide 122 will be disengaged from valve ball 131. Therefore, pressure liquid at the wheel cylinder side at 147 will be conveyed through axial bore 123 to reservoir chamber 148, thence through port 149 and piping 150 to reservoir 102.

In the case of manual operation caused by virtue of oil pressure failure, depression of the brake pedal will cause the second piston 117 through push rod 156 and first piston 114 through springs 119 and 126 being moved leftwards. Then, valve slide 122 urged by spring 126 is moved again leftwards and the seat 132 on valve slide 122 will be brought into pressure engagement with valve ball 131.

With further depression of the brake pedal, the seat 133 on first piston 114 is brought into pressure engagement with valve ball 131, thereby the chamber 142 and reservoir chamber 148 being brought into full interruption in fluid communication and the leftward movement of first piston 114 being checked completely. In the operation of the kind above-mentioned, the spring force at 134 is selected to be smaller than that at 119 and thus the spring 134 is first compressed, but the spring 119 is not so.

With further depression of brake pedal, motion will be transmitted through rod 156 to second piston 117 so that the latter is moved leftwards and the liquid pressure in chamber 142 will be increased and the wheel cylinders 147 will be subjected to a liquid pressure in correspondence to the degree of depression of the brake pedal, for performing a braking action. In this case, the hydraulic pressure in the chamber 142 is checked from reversedly flowing into accumulator 108 and indeed, by the action of check valve means 139, as will be easily understood at a glance of the drawing.

In the apparatus built in accordance with the second embodiment of the invention, first piston 114 is slidably mounted within the axial bore of cylinder 110 having an open end and said piston 114 being formed with axial bore 116. Second piston 117 is slidably mounted within the bore 116 and nearer to the brake pedal, not shown, and valve slide 122 is slidably mounted at the opposite part of the same bore 116. The chamber 142 is formed between the second piston 117 and the valve slide 122, said chamber being adapted to increase the therein prevailing liquid pressure, should a failure of pressure maintenance at the side of liquid pressure supply source take place. This chamber 142 is positioned nearer to the brake pedal than the reservoir chamber 148. It will be seen thus that although a satisfyingly longer stroke is required so as to apply a sufficient brake effort in case of the manual operation, but, in the present embodiment, this rather longer working stroke will be borne exclusively by the second piston 117 only and sufficiently. Therefore, the overall length of the apparatus can be substantially reduced in comparison with the conventional mechanism wherein the pressure-rising chamber is positioned at the side opposite to the brake pedal and through the intermediary of the reservoir chamber.

With the specific arrangement of main constituent parts as mentioned so far, the manual operation is carried into effect in such a way that at first, seat 132 on valve slide 122 is brought into pressure engagement with valve ball 131 and only thereafter, the seat 133 on first piston 114 is brought into pressure engagement with valve ball 131 by complete interruption of fluid communication between both chambers 48 and 42.

The embodiments of the invention in which an exclusive property or privilege is claimed are as follows:

1. Apparatus for the control of hydraulic brake pressure comprising a brake pedal, wheel-braking cylinder means and a liquid pressure accumulator means connected through pump means with a liquid reservoir, said apparatus further comprising a housing having an axial bore, an inlet port in said housing hydraulically connected with said accumulator means, a first outlet port in said housing hydraulically connected with said wheel-braking cylinder means, a second outlet port in said housing hydraulically connected with said liquid reservoir, a first piston slidable in and along said axial bore, a second axial bore in said first piston, a second piston slidable in and along said second axial bore and cooperating with said brake pedal, said first piston being operatively connected with said brake pedal through said second piston, a first valve means slidable in and along said second axial bore for controlling liquid communication between said inlet port and said first outlet port in cooperation with said first piston, a first liquid chamber formed in said second axial bore and defined by and between said second piston and said first valve means and hydraulically connected with said first outlet port, a second liquid chamber formed in said first axial bore and provided at the opposite side of said first valve means from said first liquid chamber, passage means extending through said first valve means, said second liquid chamber being disposed in fluid communication with said second outlet port, and a second valve means provided in said second liquid chamber for cooperation with said passage means in said first valve means for controlling liquid communication between said first and second liquid chambers.

2. Apparatus as claimed in claim 1 wherein said second valve means comprises a valve holder member and ball means held in position by said holder member.

3. Apparatus as claimed in claim 1, further comprising a first spring positioned in said first chamber between said first and second pistons, and a second spring positioned in said first chamber between said second piston and said first valve means.

4. Apparatus as claimed in claim 1, further comprising check valve means positioned between said accumulator means and said first valve means whereby upon pressure failure of said accumulator means, said first chamber will be subjected to a pressure increase by sliding movement of said second piston.

5. Apparatus as claimed in claim 3 wherein said first piston is formed with a seat portion adapted for cooperation with said second valve means upon pressure failure of said accumulator means.

6. Apparatus as set forth in claim 1 wherein said accumulator means comprises a first and second accumulator, and said braking cylinder means comprises a first and second wheel cylinder means, said first accumulator being hydraulically connected with said inlet port, said first wheel cylinder means being connected with said first outlet port.

7. Apparatus as set forth in claim 6 wherein a further inlet port is formed in said housing and connected with said second accumulator, said housing having a third outlet port hydraulically connected with said second wheel cylinder means.

8. Apparatus as claimed in claim 7, further comprising a third piston having an axial bore slidably mounted in the bore of said housing and a third valve means slidably mounted in the bore of said third piston for controlling fluid communication of said further inlet port with said third outlet port by cooperation with said third piston, said third valve means being cooperable with said second valve means.

9. Apparatus as claimed in claim 8, further comprising end closure means for said housing adjacent said third piston, a third chamber provided in the bore of said housing between said third piston, said third valve means and said end closure means and kept in hydraulic communication with said second wheel cylinder, said third chamber being controlled in its communication with said second chamber by cooperative control action of said second and third valve means.

10. Apparatus as claimed in claim 8 wherein said ball means in said valve holder member comprises first and second balls cooperating with said first and third valve means.

11. Apparatus as claimed in claim 8, further comprising a spring, one end thereof abutting on said housing and the other end thereof abutting through a retainer against said third piston, and another spring provided between said retainer and said third valve means.

12. Apparatus for the control of hydraulic brake pressure comprising a brake pedal, first and second wheel braking cylinder means and first and second liquid pressure accumulator means connected through pump means with a liquid reservoir, said apparatus further comprising a housing having an axial bore, first and second inlet ports in said housing hydraulically connected with said two accumulator means respectively, first and second outlet ports in said housing hydraulically connected with said first and second wheel braking cylinder means respectively, a third outlet port in said housing hydraulically connected with said reservoir, a first normally closed valve means operative connected with said brake pedal for controlling fluid communication between said first inlet port and said first outlet port, normally opened valve means operatively connected with said brake pedal for controlling fluid communication between said first outlet port and said third outlet port and fluid communication between said second outlet port and said third outlet port, second normally closed valve means operatively connected with said brake pedal for controlling communication between said second inlet port and said second outlet port, a first check valve means inserted between said first accumulator means and said first normally closed valve means, second check valve means inserted between said second accumulator means and said second normally closed valve means, first manually operable brake actuation means cooperable with said brake pedal in case of pressure failure at said first accumulator means so as to reduce the effective volume of the hydraulic brake pressure circuit extending between said first check valve means and said first wheel braking cylinder means, and second manually operable brake actuation means adapted for cooperation with said first normally closed valve means and said normally opened valve means so as to reduce the effective volume of a second hydraulic brake circuit extending between said second check valve means and said second wheel braking cylinder means in case of pressure failure in said second accumulator means.

13. Apparatus for hydraulic brake pressure control comprising a brake pedal, first and second wheel braking cylinder means and first and second liquid pressure accumulator means connected through a pump means with a liquid reservoir, said apparatus further comprising a housing having an axial bore, first and second inlet ports in said housing hydraulically connected with said first and second accumulator means respectively, first and second outlet ports in said housing hydraulically connected with said first and second wheel braking cylinder means respectively, a third outlet port in said housing hydraulically connected with said reservoir, a first piston slidable in and along said axial bore, said first piston having a second bore therein, a second piston slidable in and along second axial bore and cooperating with said brake pedal, said first piston being operably connected with said brake pedal through said second piston, first normally closed valve means slidable in and along second axial bore and adapted for cooperation with said first piston for controlling fluid communication between said first inlet port and said first outlet port, first check valve means inserted between said first accumulator means and said first normally closed valve means, a first liquid chamber formed within said second bore of said first piston in between said second piston and said first normally closed valve means and kept in fluid communication with said first outlet port, said first chamber being reducible in effective volume by corresponding sliding movement of said second piston in case of pressure failure in said first accumulator means, a third piston slidable in and along said first axial bore in said housing, a third axial bore formed in said third piston, second normally closed valve means slidable in and along said third bore in said third piston for controlling fluid communication between said second inlet port and said second outlet port, second check valve means inserted between said second accumulator means and said second normally closed valve means, said housing having end closure means adjacent said third piston, a second liquid chamber formed in said first axial bore of said housing between said third piston, said second normally closed valve means and said end closure means and kept in fluid communication with said second outlet port, said second chamber being reducible in its effective volume by corresponding movement of said third piston in case of pressure failure in said second accumulator means, a third liquid chamber defined by and in between said first and third pistons and kept in fluid communication with said third outlet port, and normally open valve means provided in said third chamber for cooperation with said first and second normally closed valve means for controlling fluid communication between said first and third liquid chambers as well as said second and third liquid chambers.

14. Apparatus as claimed in claim 13 wherein said normally opened valve means comprises a valve holding means, a first and a second ball valve held in position by said valve holder member, said first ball valve cooperating with said first normally closed valve means and said second ball valve cooperating with said second normally closed valve means.

15. Apparatus as claimed in claim 13 wherein said first piston is formed with a seat portion adapted for engagement with said normally opened valve means upon pressure failure in said first accumulator for interruption of fluid communication between said first and third chambers, and said third piston is formed with a seat portion adapted for engagement with said normally opened valve means upon pressure failure in said second accumulator for interruption of fluid communication between said second chamber and said third chamber.

* * * * *